United States Patent
Goodnight et al.

(10) Patent No.: US 6,941,289 B2
(45) Date of Patent: Sep. 6, 2005

(54) HYBRID NEURAL NETWORK GENERATION SYSTEM AND METHOD

(75) Inventors: James Howard Goodnight, Cary, NC (US); Wolfgang Michael Hartmann, Heidelberg (DE); John C. Brocklebank, Raleigh, NC (US)

(73) Assignee: SAS Institute Inc., Cary, NC (US)

(*) Notice: Subject to any disclaimer, the term of this patent is extended or adjusted under 35 U.S.C. 154(b) by 933 days.

(21) Appl. No.: 09/828,290

(22) Filed: Apr. 6, 2001

(65) Prior Publication Data

US 2003/0014378 A1 Jan. 16, 2003

(51) Int. Cl.[7] .............. G06E 1/00; G06E 3/00; G06F 15/18; G06G 7/00
(52) U.S. Cl. .............. 706/15; 706/16; 706/19
(58) Field of Search .............. 706/15, 16, 19

(56) References Cited

U.S. PATENT DOCUMENTS 5,335,291 A * 8/1994 Kramer et al. .............. 382/158
5,761,442 A * 6/1998 Barr et al. .............. 705/36

OTHER PUBLICATIONS

Kishan Mehrotra et al, Elements of Artificial Networks, 1997, MIT Press, 0–262–13328–8, 25, 71, 76, 85, 86, 87.*

* cited by examiner

*Primary Examiner*—Joseph P. Hirl
(74) *Attorney, Agent, or Firm*—Jones Day

(57) ABSTRACT

A computer-implemented method and system for building a neural network is disclosed. The neural network predicts at least one target based upon predictor variables defined in a state space. First, an input data set is retrieved that includes the predictor variables and at least one target associated with the predictor variables for each observation. In the state space, a number of points is inserted in the state space based upon the values of the predictor variables. The number of points is less than the number of observations. A statistical measure is determined that describes a relationship between the observations and the inserted points. Weights and activation functions of the neural network are determined using the statistical measure.

22 Claims, 13 Drawing Sheets

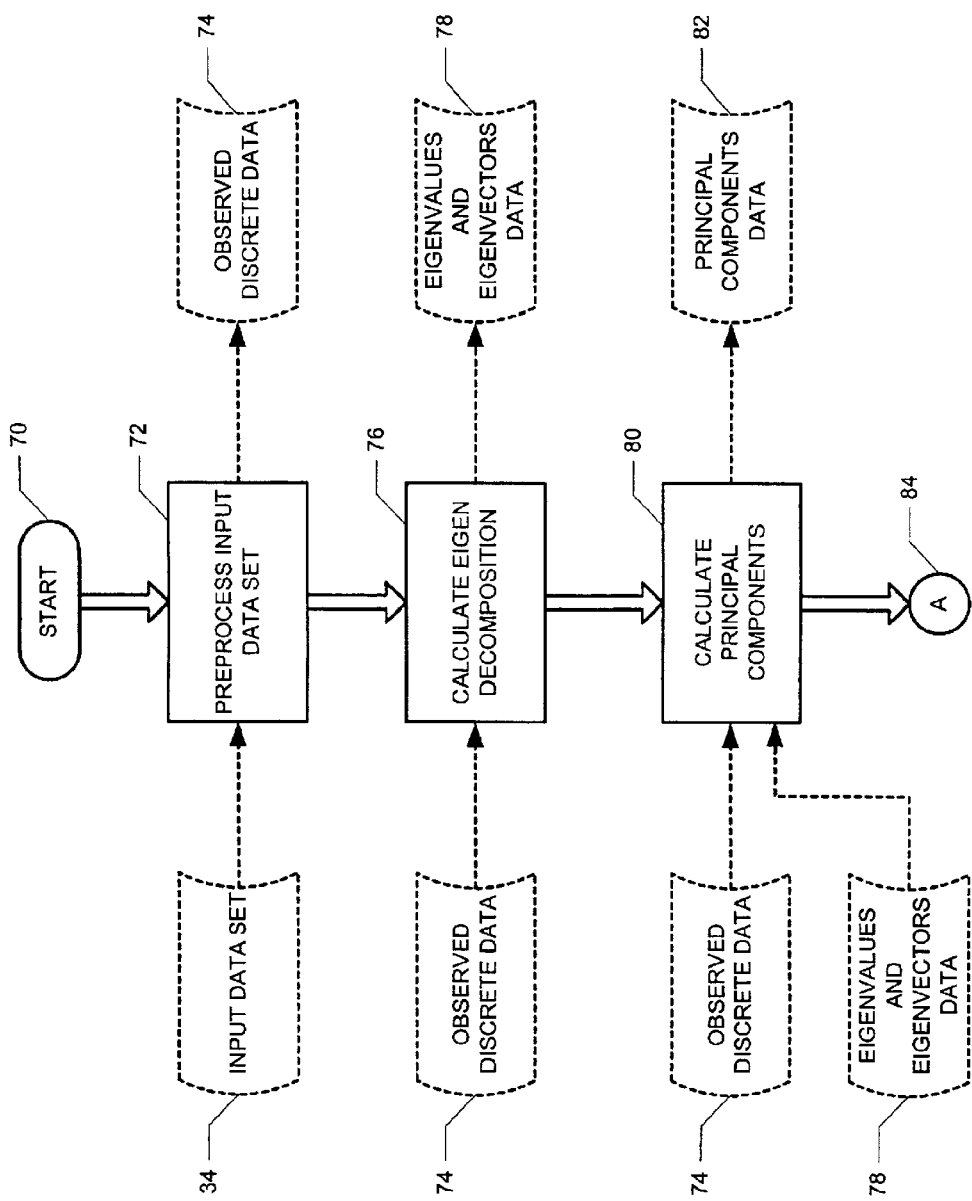

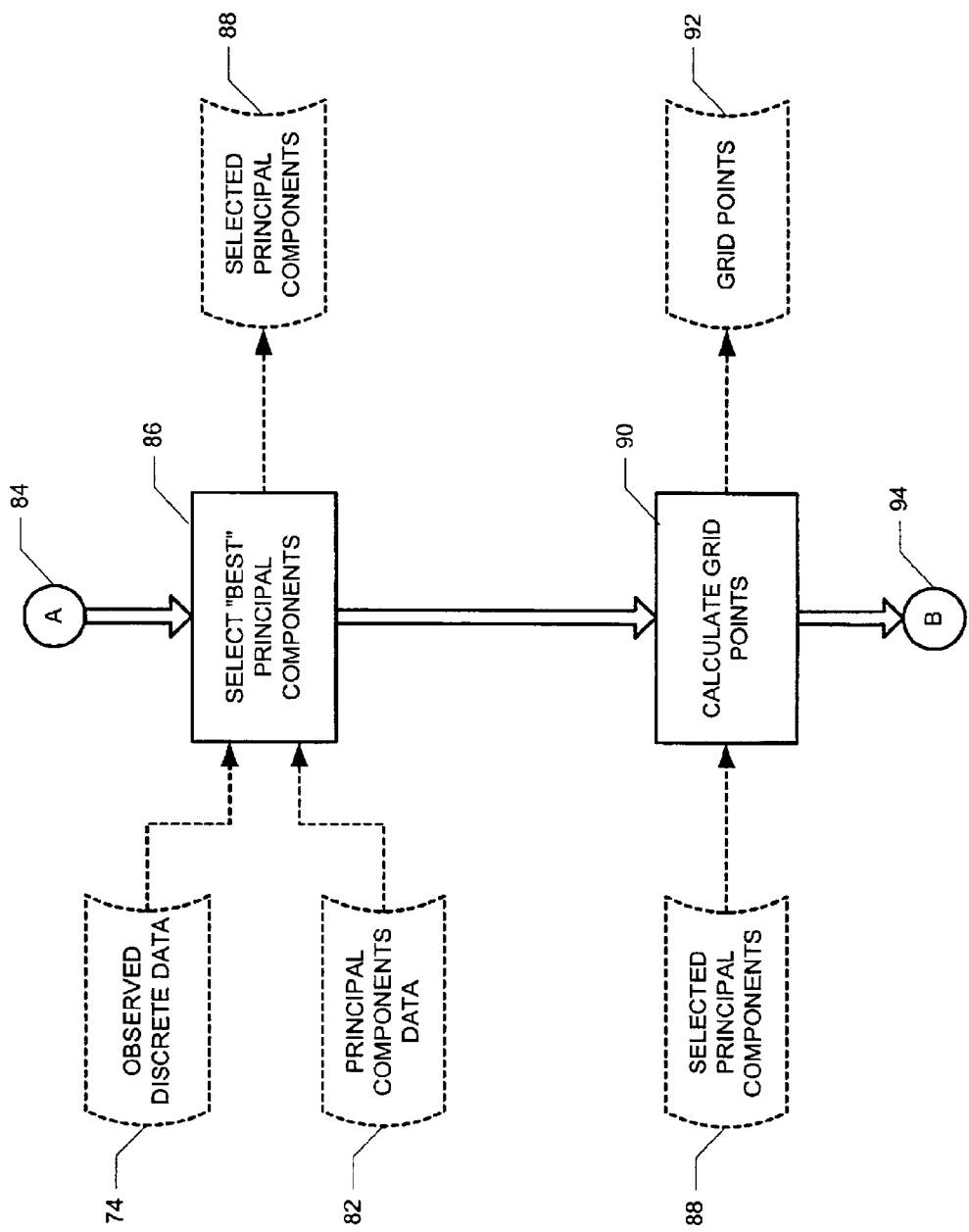

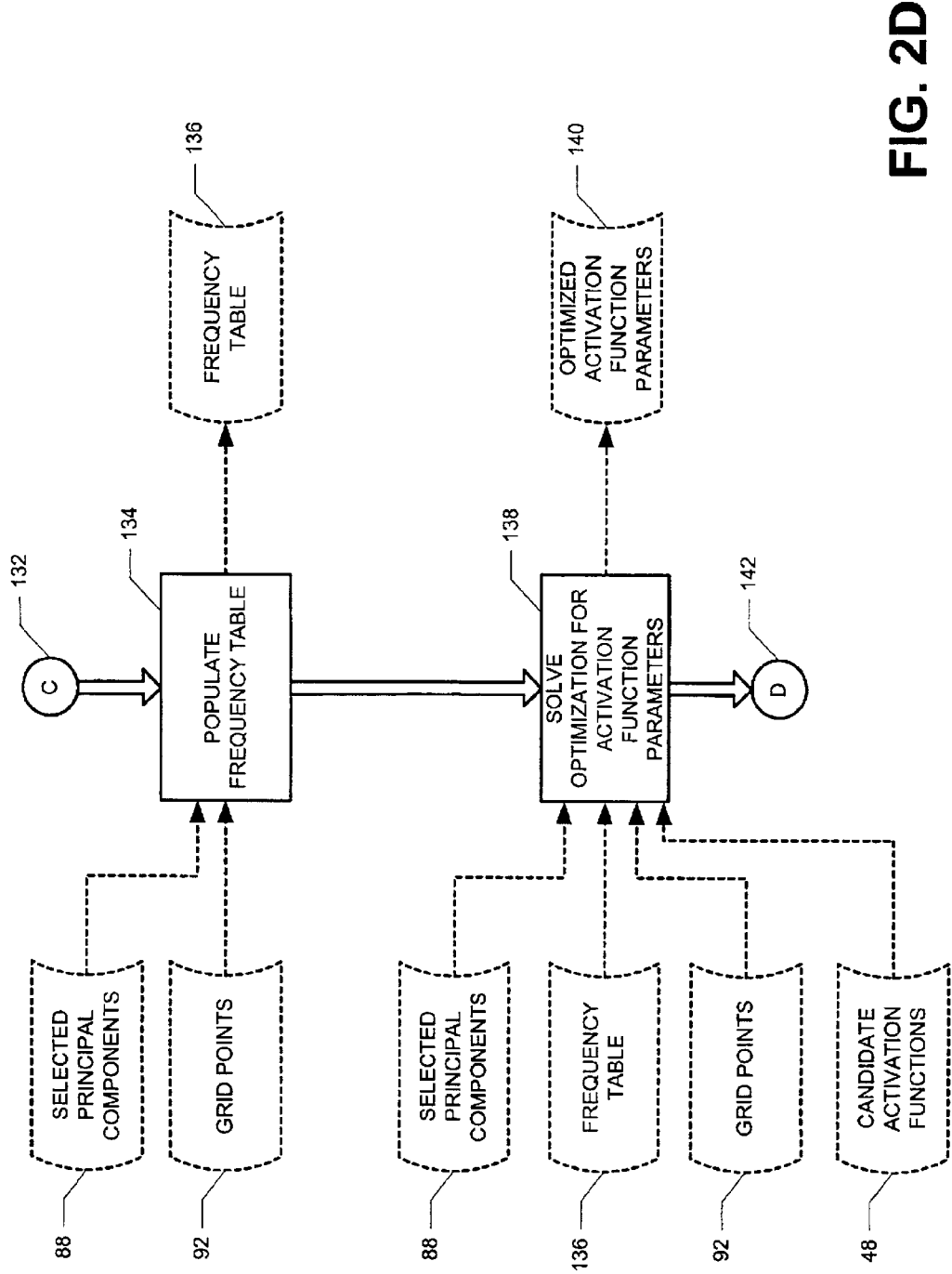

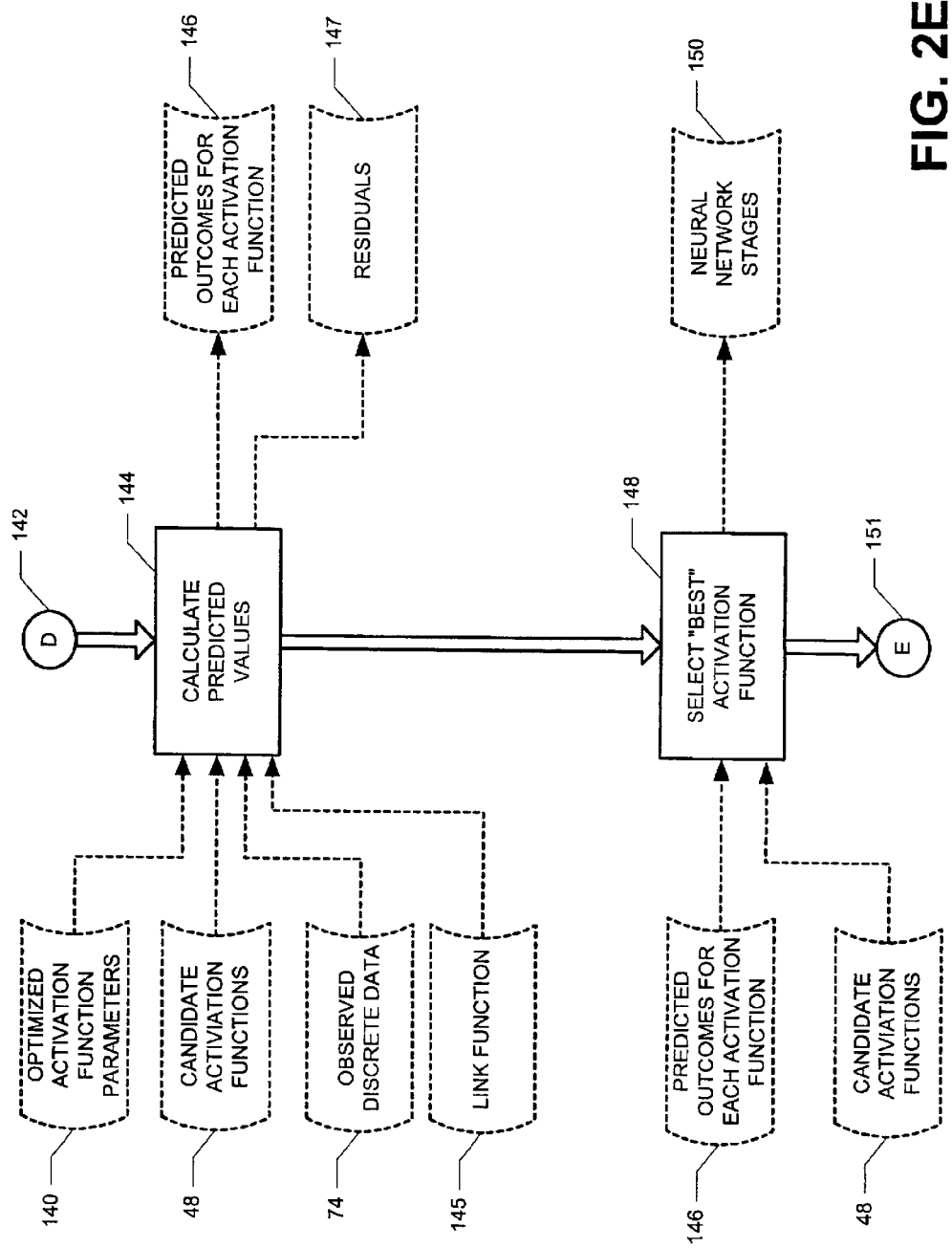

The Input data set is:

```
data dmn17;
drop i j;
array x[21] x1-x21;
do i=1 to 10000;
 x[21]=ranbin(12345,1,.7);
 do j=1 to 20;
  x[j]=rannor(1);
  end;
 output;
 end;
run;
```

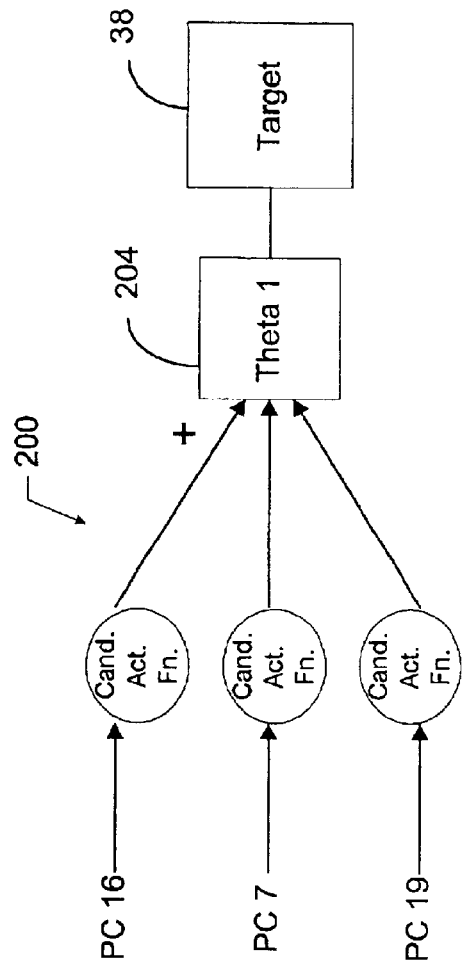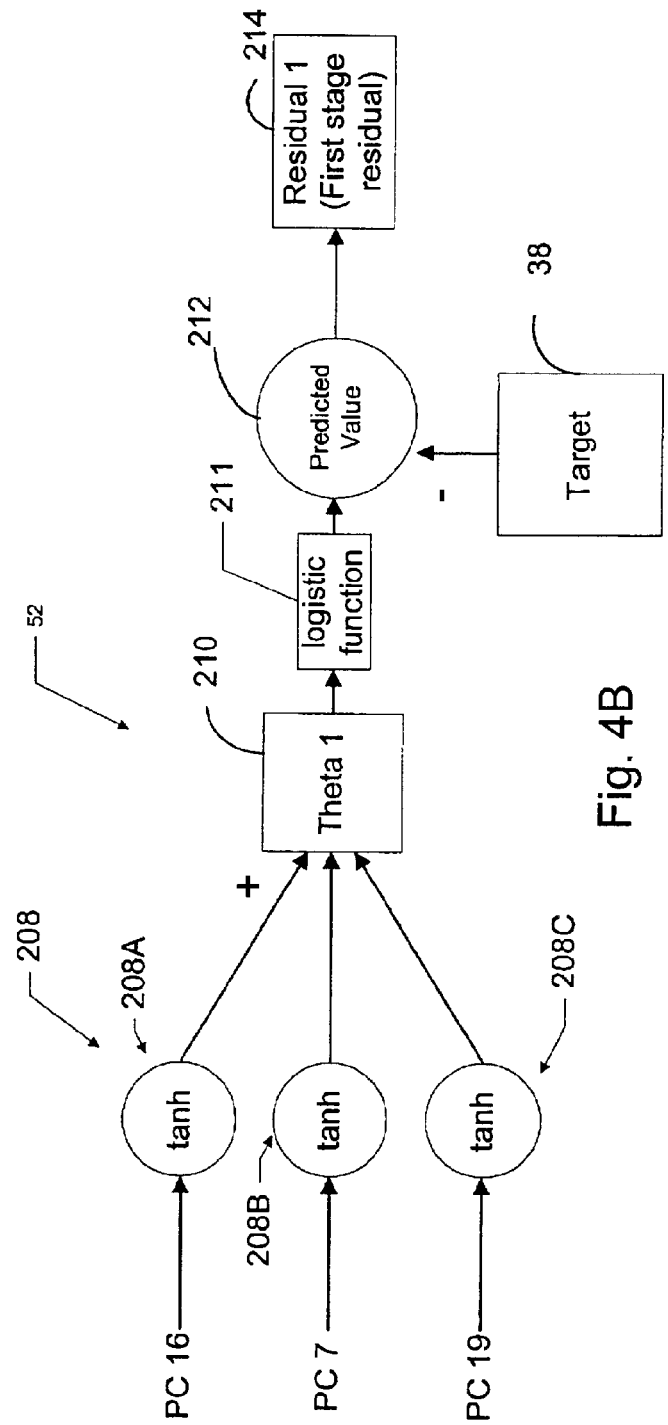
Fig. 4A
Fig. 4B

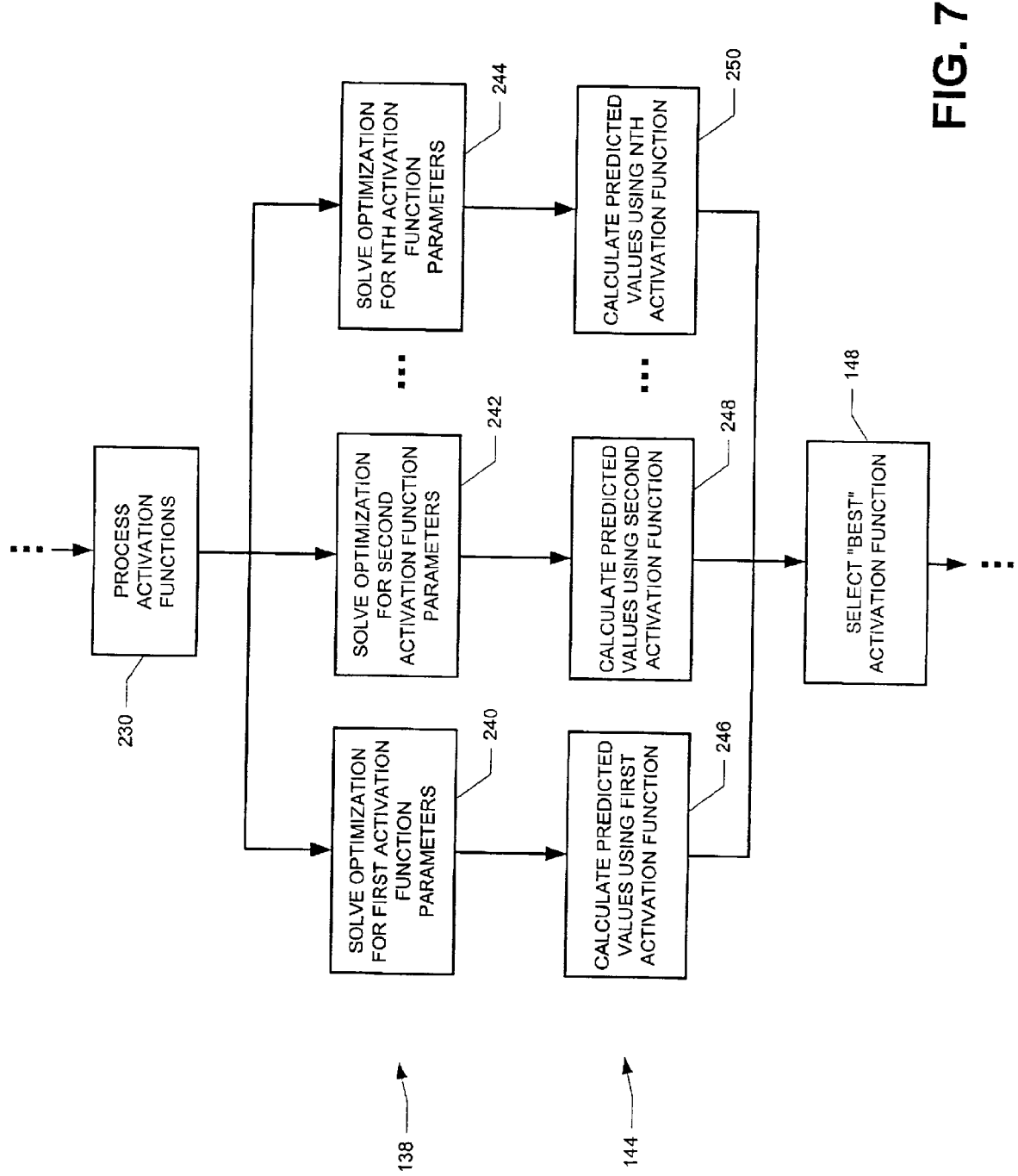

HYBRID NEURAL NETWORK GENERATION SYSTEM AND METHOD

BACKGROUND OF THE INVENTION

1. Technical Field

The present invention relates to computer-implemented artificial neural networks, and more particularly, the present invention relates to computer-implemented approaches for nonlinear modeling and constructing artificial neural networks.

2. Description of the Related Art

Neural networks are predictive models that are generally used to model nonlinear processes. Most neural networks of the current approaches begin with a large input variable set and a large trial set. The traditional approach to neural network modeling is confronted with the problem of parameter overdetermination. This approach can search spaces with too many dimensions. Furthermore, the variables of the input data can be highly collinear and generate numerical estimation problems because the resulting calculations yield underdetermined approximations and rank deficient Hessian matrices describing the search directions during the optimization process. These search directions are used to optimize the performance index of the neural network. A rank deficient Hessian matrix corresponding to these search directions generally defines a state space where an objective function (or any other type of performance index) does not appreciably change with small, discrete changes to the weights and biases of the neural network. Because the objective function remains constant within this long, flat state space, the training cycle can prematurely end at a local optimum point. Furthermore, because these points are localized optimum points, the neural network may become sensitive to the starting point.

Large trial sets and large input sets also increase the required training time for a neural network. The calculation time for the neural network is based on the number of iterations, the input data size, and whether the Hessian matrix is of full rank. Because the input size is a function of the number of trials and the number of input variables, training becomes a tradeoff between introducing more input variables and trials and time that is put into training. Since each iteration takes at least one run through the entire data set, the computer time needed for solving the estimation problem depends upon where the data set is stored: in core memory (RAM) or on file (hard drive). For large data sets the traditional neural network algorithms are forced to keep the data on file which means slow read access during each run through the data. Furthermore, neural networks are generally not tested across different network structures and different activation functions because changing the structure or the activation functions generally requires retraining the entire neural network. The large input size makes testing these criteria time consuming.

SUMMARY OF THE INVENTION

The present invention overcomes the aforementioned disadvantages as well as others. In accordance with the teachings of the present invention, a computer-implemented method and system are provided for building a neural network. The neural network model predicts at least one target based upon predictor variables defined in a state space. First, an input data set is retrieved that includes the predictor variables and at least one target variable. A number of points are inserted in the state space based upon the values of the variables in the observation set. The number of points is less than the number of trials. A statistical measure is determined that describes a relationship between the trials and the inserted points. Weights and activation functions of the neural network are determined using the statistical measure. In an embodiment of the present invention, the present invention selects an activation function type from a given set of candidate activation functions for use within each layer of the neural network.

BRIEF DESCRIPTION OF THE DRAWINGS

FIGS. 2A–2F are flow charts that depict the operational steps to construct a neural network in accordance with the teachings of the present invention;

FIG. 3 is computer source code output that generates exemplary input data for use by the present invention;

FIGS. 4A and 4B are neural network structure diagrams that depict the addition of a first neural network layer in accordance with the teachings of the present invention;

FIG. 7 is a system block diagram that depicts a distributed processing embodiment of the present invention for separately optimizing activation functions.

DETAILED DESCRIPTION OF THE PREFERRED EMBODIMENT

Figure 1:
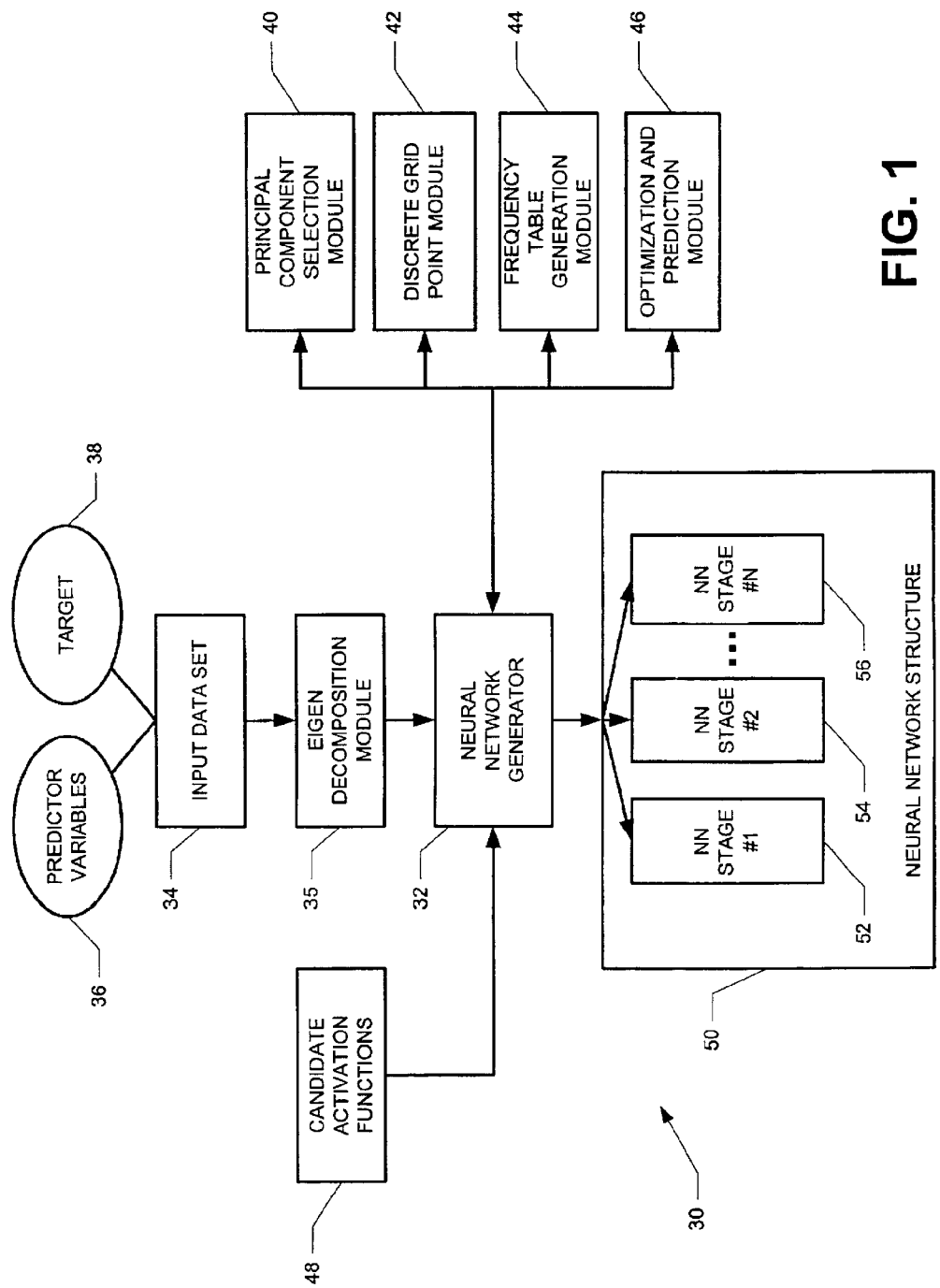
FIG. 1 is a system block diagram that depicts the computer-implemented components used to construct a neural network in accordance with the teachings of the present invention.

FIG. 1 depicts a computer system 30 that generates layer-by-layer a neural network 50. Each iteration of the computer system 30 adds a layer to the neural network 50 that further hones the capacity of the growing neural network 50 to predict a target 38 based on a predictive observation variable set 36. A neural network generator 32 determines the structure of the neural network 50. The neural network generator 32 calls upon software modules (40, 42, 44 and 46) to select and train a set of candidate activation functions 48 to form the stages (52, 54 and 56) based on an input data set 34 that generates principal components in an eigen decomposition module 35.

The input data set 34 includes the predictive observation variables 36 and at least one target variable 38. The target variable 38 is the measured output variable for the given set of predictive observation variables 36. For example, in a loan office, the target variable may be a risk rating for a loan recipient. Predictive variables may be size of the loan, income of the recipient, married or single recipient, number of workers in the household of the recipient, number of eligible workers in the household of the recipient, and current liability of the recipient. These loan-related observation and target variables define the state space within which the present invention operates.

The input data may contain different types of data. Furthermore, the data may contain redundant information that can be reduced to fewer variables by principal components analysis. For example, the number of eligible workers, the number of workers, and the marital status of the recipient(s) may contain similar data that the principal components analysis may reduce to fewer variables.

The neural network generator 32 first pre-processes the input data set 34 to ensure that the data is in an acceptable format. For example, the neural network generator 32 may set up dummy variables from class (non-numeric categorical) variables. Dummy variables for class variables are used like interval variables to avoid the complexity of processing non-numeric variable types that can be encountered in large data sets.

The neural network generator 32 uses software module 35 to obtain the input data set's eigenvalue decomposition and then the principal components from the eigenvectors of the eigenvalue decomposition. These principal components are orthogonal vectors that include the entire state space of the original input data set 34. Thus the state space of the principal component set is a rotated state space of the input data 34.

The neural network generator 32 selects a subset of those principal components which are highly associated (e.g., highly correlated) to the target variable 38 using a linear regression model in the principal component selection module 40. The chosen principal components can generate a state space similar to the original state space of the input data 34, but having fewer variables by including the chosen subset of principal components. The neural network generator 32 may use a principal component selection criterion, such as R-Square or F value to determine which principal components have the greatest predictive capacity for the input data set 34. Thus the neural network generator 30 can reduce the number of input variables by reducing the predictor variables data set 36 to a set of principal component scores (PCS) that are fewer in number than the number of input variables.

The neural network generator 32 further reduces the predictor variables data set 36 by reducing the number of trials into a set of discrete grid point values. Discrete grid point module 42 determines the number of discrete grid points, N, for training the neural network 50 that is under construction. The grid points define a set of theoretical training values for the neural network. The grid points allow the neural network generator 32 to train an input set that is an approximation of the input data set 34. The overall maximum and minimum values of the selected PCS are determined. This spread defines a range within which the module 42 inserts a certain number of discrete grid points. The number of grid points inserted within the range is significantly less than the number of trials.

Module 44 generates a multidimensional frequency table having dimensional sizes equivalent to the number of selected principal components from module 40 and the number of discrete grid points from module 42. For example, if module 40 determines that three principal components are required and module 44 determines seventeen grid points are required, then the size of the multidimensional frequency table is 17 by 17 by 17. During one run through the data each observation is scored on the three principal components yielding three PCS values which correspond to three grid point numbers (i,j,k) determining the entry of the 3 dimensional frequency table in which the observation is counted. Thus, the total sum of all entries of the multidimensional frequency table equals the number of trials in the input data set 34. This frequency table may more often fit in core memory so that the optimization does not need to access the large raw data set during each iteration of the optimization process.

Module 46 uses the entries of the frequency table generated in module 44 and the values of discrete grid points generated in module 42 to determine which of the candidate activation functions 48 acts as the best predictor for a layer. The candidate activation functions 48 contain parameters (weights) that are optimized using the reduced data set. The frequency table specifies which observation values of the selected principal components should be assigned greater weight during the parameter optimization process. Once the parameters for the candidate activation functions 48 are determined, each candidate activation function is tested by a single pass through the data. The predicted outcomes of each candidate activation function are ranked according to the ability of a candidate activation function to match the target variable 38. The present invention ranks the activation functions according to a model selection criteria. For example, the model may use a sum of square errors function or an accuracy rate to rank the candidate activation functions. The model selection criteria may be made by a user or may be set to a default based on the type of target variable (e.g., binary, interval, or continuous target). The highest ranked candidate activation function along with its optimized parameters are used to create a layer of the neural network structure.

The neural network generator 32 performs subsequent iterations to generate additional stages. Each stage's residuals between the predicted outcomes of the selected activation function and the target values are used by the modules 40, 42, 44 and 46 to determine the next stage of the neural network 50. For example in the first stage, the modules 40, 42, 44 and 46 use the input data set 34 to generate the first stage 52 of the neural network 50, but then use the residuals from the first stage to generate the second stage 54. Stages are added until the maximum number of stages has been reached, the neural network's predictive capability does not significantly improve, or the neural network's predictive capability has reached a threshold value for correctly mapping the input data set 34.

Because each stage is optimized independent of other stages, the neural network generator 32 may optimize activation functions from the candidate activation functions 48 in parallel and then compare the results from the different activation functions in order to select the activation function that best predicts the residuals from a previous stage. Moreover, because each activation function has only a few parameters compared to a multi-layer neural network, the optimization and prediction module 46 can train the activation functions with nonlinear methods that otherwise would be too time consuming for traditional network training methods. Thus, the neural network generator 32 reduces the input data set both in the number of variables (by using principal component analysis) and in the number of trials (by using discrete grid points), and then uses the reduced input set to individually train stages (52, 54 and 56) of the neural network 50 to predict the target 38. Also, the present invention may result in different types of activation functions being used for the stages (52, 54 and 56). For example, the present invention may determine that a square activation function is the best fit for the first stage 52, while a sine activation function is the best fit for the second stage 54.

The neural network generator 32 can reduce the size of the input data set 34 by implementing a subset of the principal components as determined in module 40, or by implementing a discrete version of the input data set 34 as determined by the modules 42 and 44, or by implementing both the subset of principal components and the discrete version of the input data 34. These reductions resize the input data set so that training can proceed more efficiently than training with the input data set 34 alone. The choice between the type of reduction, or possibly if no reduction is performed, may be based on the initial size of the input data set 34 and the collinearity of the variables in the input data set 34. After the input data set 34 is processed by these modules 40, 42, 44, and 46, then the neural network generator 32 may process each of the stages of the neural network 50.

The operation of the present invention to dynamically and quickly generate the neural network 50 one stage at a time is shown in greater detail in the flowcharts of FIGS. 2A–2F.

With reference to FIG. 2A, start block 70 indicates that process block 72 is performed first. Process block 72 retrieves and normalizes the predictor variables data set 36. Because the constructed neural network uses numerical expressions for data sets, class variables (for example, marital status) are manipulated by process block 72 into "dummy" variables that have relative numerical values. Interval targets (for example, risk rating) may be decile ranked to determine the best activation function when using accuracy tables as a model selection criteria. As the predictor variables data set 36 is loaded and normalized, the predictive and target variables are numerically evaluated into variable types that are consistent with the input type for the constructed neural network and stored as observed discrete data set 74. As a non-limiting example, process block 72 processes the input data generated by the computer code shown in FIG. 3. The computer code generates per trial a binary target at source code line 160 and 20 interval inputs at source code line 162. The computer code forms a data set of 10,000 observations (i.e., 10,000 trials, or rows) and 21 variables (columns), one of them being the target variable. Because the values do not need to be discretized in this example, the input data is stored as the observed discrete data set 74, and processing continues at process block 76 on FIG. 2A.

Process block 76 determines the eigen decomposition of the X'X matrix where the observed discrete data set 74 is first scaled to the matrix X. For the example at hand, process block 74 computes the matrix X'X, where X contains the standardized inputs and is the centered and scaled matrix of the 20 variables and 100 observations. Process block 76 determines the eigenvalues and eigenvectors of these standardized inputs. The twenty eigenvalues and eigenvectors correspond to the twenty variables of the example. Processing continues at process block 80.

At process block 80, the principal components of the observed discrete data set 74 are calculated using the associated eigenvectors from block 78 and thus a total of 20 components can be created. The input data set 34 is transformed into an uncorrelated input data set by computing the principal component scores. The predictability of each principal component to the target variables can then be obtained independently. Continuation block 84 indicates that processing continues at process block 86 on FIG. 2B.

With reference to FIG. 2B, process block 86 selects a subset of principal components for analysis based on which principal components in the data set 82 best predict the target variable 38. A statistical measure of fitness, such as an R-Square or F-value test, measures the capacity of each of the principal components to predict the target variable 38. Process block 86 selects the principal components that are the most predictive and stores the selected ones as data set 88. With respect to the example at hand, process block 86 performs a regression of the principal component scores with the target, which reveals that the scores of principal components 16, 7 and 19 are the most predictive components with the target variable X21. This degree of association is shown by the R-Square values in the following table:

TABLE 1

First Stage Selected Principal Components

| Principal Component | Eigenvalue | R-Square | F Value | p-Value | SSE |
|---|---|---|---|---|---|
| 16 | 60.246681 | 0.016013 | 1.611111 | 0.2073 | 65.927112 |
| 7 | 115.936861 | 0.013921 | 1.406337 | 0.2385 | 64.994418 |
| 19 | 41.035605 | 0.012722 | 1.288969 | 0.2590 | 64.142076 |

Component Selection: SS(y) and R2 (SS_total = 67)

Therefore principal components 16, 7 and 19 are the principal components subset 88 selected for use in determining the first stage of the neural network. The number of principal components selected in the components subset 88 determines the dimensionality of the frequency table. Processing continues at process block 90.

Process block 90 determines the number of discrete grid points, N, for training the neural network that is under construction. The grid points define a set of theoretical training values for the neural network. The grid points allow the neural network to train to an input set that is an approximation of the predictor variables data set 36. Process block 90 determines the overall maximum and minimum values of the selected PCS. This spread defines a range within which the present invention inserts a certain number of discrete grid points. The total number of grid points may be assigned by the user or by default settings. Generally, the greater the number of selected principal components used, the lesser the number of grid points that can be used because of computational power required for large input sets. The tradeoff between the number of grid points and the number of selected principal components is determined by available computational power and the application at hand. Within the frequency table, the number of discrete grid points may be used to determine the size of each of the dimensions, which were determined by the number of principal components. Thus, having many principal components and many grid points may cause computational time to increase significantly. Moreover, additional grid points and selected principal components may overspecify the neural network because a limited number of parameters are being optimized. The present invention's well specified matrix of selected principal components and grid points result in well specified Hessian matrices where starting values are easily found and convergence can be accomplished at least quadratically instead of the linear convergence found in most of the previous approaches.

Figure 2C:
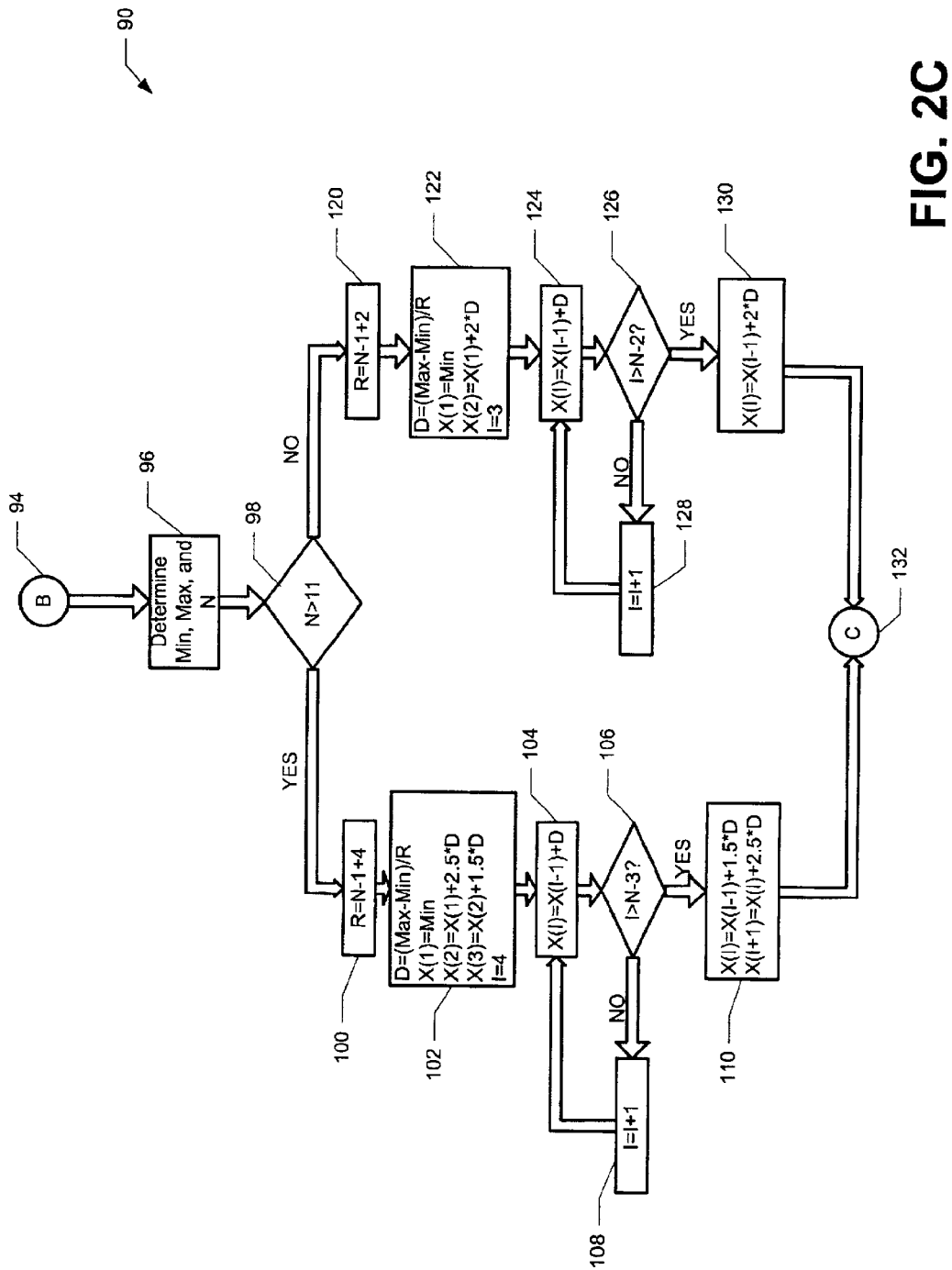

FIG. 2C depicts in greater detail how process block 90 determines the grid points data set 92. The variables used in the flowchart of FIG. 2C have the following meaning:
 (a) N: the number of discrete grid points.
 (b) MAX and MIN: the maximum and minimum numbers among all the scored values of the selected principal components.
 (c) R: a proper divisor (N−1+4, or N−1+2).
 (d) D: The distance between the minimum and maximum value after being divided by R (i.e., a spacer to space adjacent grid point values).

Process block 96 searches the scores of selected principal components for their minimum and maximum values. Process block 96 also selects a default number of grid points N of the selected principal component scores based upon the number of selected principal components. The following table shows exemplary default values for N:

TABLE 2

Discrete Grid Points Number Selection

| The Number of Principal Components | The Number of Discrete Grid Points by Default ("N") |
|---|---|
| 2 or 3 | 17 grid points |
| 4 | 15 grid points |
| 5 | 13 grid points |
| 6 | 11 grid points |
| Otherwise | 9 grid points |

However, users can specify any number between, for example, 5 and 19 regardless of the number of principal components. The grid points are obtained from the scored principal components and it is one single set across all the selected principal components.

Decision block 98 examines whether the pre-selected number of bins, N, is greater than eleven. If the pre-selected number of bins is greater than eleven, then processing continues at process block 100 where a bin divisor, R, is calculated. Process block 102 calculates a bin spacer, D, and the grid points for the first three bins. A counter, I, is also set to the value four. Process block 104 calculates the next grid point, X(I), as a function of the previous grid point and the bin spacer. Decision block 106 examines whether the counter I is greater than N−3. If I is not greater than N−3, then I is incremented by one at process block 108 and the next grid point is calculated at process block 104. However, if I is greater than N−3, then process block calculates the last two grid points in block 110.

If at process block 98, N is less than eleven, then processing continues at process block 120 where the bin divisor R is calculated. The bin spacer D, the first two grid points, and the counter I are determined at process block 122. The next grid point X(I) is calculated by process block 124. If decision block 126 determines that I is not greater than N−2, then I is incremented by one by process block 128 and the next grid point is calculated at process block 124. If I is greater than N−2, then the final grid point is calculated by process block 130.

For the example at hand, the present invention selects seventeen bins because there are three selected principal components. This results in a frequency table having three dimensions, each dimension having seventeen entries. Thus, the frequency table has a size of 17 by 17 by 17. This size is less than the 3 by 10,000 size of the PCS reduced input matrix. Moreover, suppose there are 10 million observations, the frequency table would still be sized 17 by 17 by 17. Therefore, the saving in computer time is even more drastic for larger data sets. The 17 bins for the first stage of the example (as determined by the flowchart of FIG. 2C) are shown in the following table:

TABLE 3

First Stage Grid Points Table

| Bin # | Value |
| --- | --- |
| Bin 1 | −2.681015292 |
| Bin 2 | −1.978837234 |
| Bin 3 | −1.557530399 |
| Bin 4 | −1.276659175 |
| Bin 5 | −0.995787952 |
| Bin 6 | −0.714916729 |
| Bin 7 | −0.434045506 |
| Bin 8 | −0.153174282 |
| Bin 9 | 0.127696941 |
| Bin 10 | 0.4085681643 |
| Bin 11 | 0.6894393876 |
| Bin 12 | 0.9703106109 |
| Bin 13 | 1.2511818342 |
| Bin 14 | 1.5320530575 |
| Bin 15 | 1.8129242808 |
| Bin 16 | 2.2342311157 |
| Bin 17 | 2.936409174 |

Due to the operations of the flowchart of FIG. 2C, the grid points are spaced between the minimum and the maximum values of the scores of principal components. The initial grid points and the final grid points are spaced farther apart from subsequent points (i.e., their neighboring points) than subsequent points in the middle of the grid. This spaces the end values for the grid points, which likely contain fewer samples, farther apart. In the middle of the grid points, where more observations are likely to fall, the spacing is closer. Also, some of the activation functions show a more interesting shape behavior in the center than on the outside. Therefore placing more points in the center can increase the precision of approximation. Processing continues at process block 134 on FIG. 2D.

With reference to FIG. 2D, process block 134 generates a multidimensional frequency table 136 based upon the scores of selected principal components data set 88 and grid points data set 92. The multidimensional frequency table 136 generated by process block 134 is a matrix of bins that hold the number of observations of a selected principal component when the score value of the principal component is nearest to the value of the bin. In other words, the frequency table counts the number of trials in which the score value of a selected principal component is close to the value of the bin.

The middle point for Bin 1 is the middle point between the Bin 1 grid point and the Bin 2 grid point: (−2.681015292+−1.978837234)/2 which is −2.329926. Middle points for the other bins are similarly determined. The frequency of each selected principal component for a bin is determined by the number of trials with principal component score values found within the range of a bin. Thus with respect to the above frequency table, the number of trials contained within bin 1's range (i.e., −2.681015 to −2.329926) for principal component 17 was zero.

A bin's frequency value is incremented for every score value of a principal component that lies within the range specified by the bin. The sum of the frequencies stored in all of the bins for a particular principal component is the total number of trials. The values of the bins range from the minimum value of a PCS for all trials to the maximum value of the PCS for all trials. The bins at the minimum and maximum values are spaced farther apart than bins near the middle value of a principal component. The frequencies corresponding to the bins for the example are shown in the following table:

TABLE 4

First Stage Frequency Table

| | Bin Starting Value | Bin Middle Point | PC 17 Frequency | PC 7 Frequency | PC 19 Frequency |
| --- | --- | --- | --- | --- | --- |
| Bin 1 | −2.681015292 | −2.329926 | 0 | 2 | 0 |
| Bin 2 | −1.978837234 | −1.768184 | 2 | 4 | 1 |
| Bin 3 | −1.557530399 | −1.417095 | 4 | 8 | 3 |
| Bin 4 | −1.276659175 | −1.136224 | 5 | 6 | 1 |
| Bin 5 | −0.995787952 | −0.855352 | 7 | 3 | 9 |
| Bin 6 | −0.714916729 | −0.574481 | 10 | 9 | 11 |
| Bin 7 | −0.434045506 | −0.29361 | 12 | 11 | 15 |
| Bin 8 | −0.153174282 | −0.012739 | 18 | 14 | 19 |
| Bin 9 | 0.127696941 | 0.2681326 | 18 | 8 | 14 |
| Bin 10 | 0.4085681643 | 0.5490038 | 6 | 12 | 10 |
| Bin 11 | 0.6894393876 | 0.829875 | 5 | 8 | 12 |
| Bin 12 | 0.9703106109 | 1.1107462 | 5 | 3 | 3 |
| Bin 13 | 1.2511818342 | 1.3916174 | 5 | 1 | 2 |
| Bin 14 | 1.5320530575 | 1.6724887 | 2 | 4 | 0 |
| Bin 15 | 1.8129242808 | 2.0235777 | 1 | 4 | 0 |
| Bin 16 | 2.2342311157 | 2.5853201 | 0 | 3 | 0 |
| Bin 17 | 2.936409174 | 1.798E308 | 0 | 0 | 0 |

Process block 138 optimizes a pre-selected set of activation functions, using the frequency table 136, the middle values of the grid points data set 92, and the score values of selected principal components data set 88. The optimization determines the best parameters of each activation function for the current stage. The middle values of the bins, weighted with the appropriate frequency table value from the frequency table 136, are used to optimize candidate activation functions 48 that are specified by the user or default from the system. As shown by the following table, each activation function has two parameters (a and b):

TABLE 5

Activation Functions

| Activation Function | Formula |
|---|---|
| SQUARE | (a + b*x)*x |
| TANH | a*tanh(b*x) |
| ARCTAN | a*atan(b*x) |
| LOGISTIC | exp(a*x)/(1 + exp(b*x)) |
| GAUSS | a*exp(−(b*x)$^2$) |
| SIN | a*sin(b*x) |
| COSINE | a*cos(b*x) |
| EXPONENTIAL | a*exp(b*x) |

One additional parameter is being used for an additive constant (intercept). Assuming there are three principal components selected, the total number of parameters for the optimization process is three times two plus one which equals seven. This is a very small number of parameters for the optimization algorithm. All data may be kept in core memory which allows many optimizations for different activation functions and stages can be performed even for very large data sets.

The parameters are optimized for a layer. Only the parameters of the best activation function are saved from the previous stage's layer. Because the activation functions are optimized for each activation function in a single layer, the processing tasks may be distributed such that each activation function for a given stage can be optimized simultaneously.

The present invention preferably optimizes the parameters using well specified objective functions (not overspecified as in common neural networks) with only a few parameters and with a nonsingular Hessian matrix. With such an approach, the present invention can yield the following advantages as well as others: "good" starting values are obtained more easily because there are only a few parameters; and the nonsingular Hessian matrix results in a quadratic convergence rather than linear convergence which is a result of the highly rank-deficient Hessian matrix in common neural networks.

The "a" and "b" parameters of the activation functions are optimized to fit each activation function to the objective function by using the weighted bin values. A non-linear optimization, such as a Levenberg-Marquardt algorithm, is implemented to minimize the objective function by adjusting the parameter estimates. The Levenberg-Marquardt algorithm is particularly well suited for minimizing sum of square or nonlinear functions, and thus is used for the objective function optimization. For example, the Levenberg-Marquardt algorithm optimizes functions that are based on the sum of square errors calculation. For additional information regarding the Levenberg-Marquardt algorithm, see Hagan, M. T., et al., Neural Network Design, p. 12–19 et seq., PWS Publishing Co., Boston, Mass., 1996.

For each activation function, the Levenberg-Marquardt algorithm solves for both parameters, a and b. The Levenberg-Marquardt algorithm also solves each activation function for a single weighting factor, W. Thus, for three principal components, each activation function has a total of seven parameters that are solved for each stage. For example, there are three neural network nodes corresponding to the three selected principal components for this stage in the example. For any other number of principal components, N, the number of parameters that are optimized in the Levenberg-Marquardt algorithm is 2N+1, where "2N" accounts for the fact that each principal component is associated with a node having an activation function with two parameters (a and b). The value of "1" is added to "2N" to account for an intercept (additive constant).

In the example, the objective function is "SSE" which is the sum of squares (that is, $(y - \hat{y})^2$) where $\hat{y}$ represents the predicted values from a model in which there are two parameters for each activation function and one intercept. The vector y is the target vector for the first stage and is the residuals vector from the previous stage for the other stages (these residuals are based on the results of the best activation function processing the input data set reduced to its principal components from all the previous stages). Preferably, the Levenberg-Marquardt optimization algorithm is used to minimize this sum of squares.

For every stage and activation function, the present invention selects a set of initial values to start the optimization. For example, we have the following initial parameter values for the first stage and for the activation square function:

TABLE 6

First Stage Initial Parameter Values
Activation Function = Square

| N | Parameter | Estimate | Gradient Objective Function |
|---|---|---|---|
| 1 | X1 | 0.500000 | −0.002152 |
| 2 | X2 | 0.500000 | −0.003322 |
| 3 | X3 | −0.500000 | −0.012033 |
| 4 | X4 | 0.500000 | −0.009361 |
| 5 | X5 | 0.500000 | 0.003272 |
| 6 | X6 | −0.500000 | 0.005146 |
| 7 | X7 | 0.500000 | 0.005469 |

Value of Objective Function = 0.0986707404

This set of initial values is the starting point to minimize the objective function. Once these initial values are selected, the optimization is performed to minimize the objective function as a function of the parameters. The optimization results for this activation function are shown in table 7:

TABLE 7

First Stage Levenberg-Marquardt Optimization Results
Scaling Update of Moré (1978)
Parameter Estimates = 7
Optimization Start
Active Constraints = 0; Objective Function = 0.0986707404
Max Abs Gradient Element = 0.0120327563; Radius = 1

| Iter | Restarts | Func Calls | Active Constraints | Max Obj. Func. | Abs Obj Fun Change | Actual Over Grad. Elem | Lambda | Pred. Change |
|---|---|---|---|---|---|---|---|---|
| 1 | 0 | 2 | 0 | 0.09154 | 0.00714 | 0.00335 | 0 | 0.952 |
| 2 | 0 | 3 | 0 | 0.09007 | 0.00146 | 0.00143 | 0 | 1.238 |
| 3 | 0 | 4 | 0 | 0.08972 | 0.000352 | 0.000479 | 0 | 1.187 |

The optimized parameter values (a, b and w) for the three selected principal components are shown in the following table:

TABLE 8

First Stage Optimization Parameter Estimates
Square Activation Function

| N | Parameter | Gradient Objective Estimate | Function |
|---|---|---|---|
| 1 | X1 | 0.715329 | −0.000479 |
| 2 | X2 | 0.653387 | 0.000048750 |
| 3 | X3 | −0.178784 | 0.000020773 |
| 4 | X4 | 1.749386 | −0.000071695 |
| 5 | X5 | 1.101850 | −0.000359 |
| 6 | X6 | −0.920529 | 0.000172 |
| 7 | X7 | −0.016222 | −0.000281 |

Value of Objective Function = 0.0897205371
Iter = 3 Crit = 0.08972054: SSE = 17.9441074 Acc = 76.0000

The first parameter in the table is the weight. The second parameter in the table represents the optimized "a" value for principal component 17. The third parameter represents the optimized "b" value for principal component 17. The next four entries are the resulting parameter estimates for the other two principal components.

Via the discrete approach to the optimization problem using the binned PCS values, the present invention deals with specified optimization problems with full rank Hessian matrices which do not have many parameters and for which good starting points are obtained. Therefore the convergence of the nonlinear optimizer is very fast. The function and derivative calls during the optimization do not require any passes through the entire data set except for the final outcome evaluations and the generation of residuals because the present invention uses a multidimensional frequency table of the binned PCS and the nonlinear optimization techniques to choose activation functions and select parameter values. Through the use of this optimization the training cycles for the neural network are eliminated and replaced with this optimization technique.

With reference to FIG. 2E, once the parameters for the activation functions are optimized, process block 144 uses a link function 145 to connect the activation functions in turn to the observed discrete data set 74 and determines predicted outcomes for each of the trials in the observed discrete data set 74. An embodiment of the present invention utilizes one of the following link functions depending on the type of response: a logistic function for a binary response to determine predicted values; or an identity function for an interval response to determine predicted values. However, it should be understood that different link functions can be used to fit the application at hand.

Each activation function is tested by a single pass through the trial data 74 substituting an activation function from the candidate activation functions 48. The predicted outcomes of this single pass are ranked according to the ability of the activation function to match the target variable. More specifically, process block 144 creates for each candidate activation function 48 a predicted outcome for each trial. The predictive evaluation of each candidate activation function 48 uses the proper optimized parameters 140. The predicted outcome is checked against the target outcome and evaluated based, for example, on sum of square errors or an accuracy table. If the optimization is based on the sum of square errors measurement, then the activation function with the smallest sum of square errors is selected. If the optimization is based on an accuracy table, then the accuracy table for interval targets can be split into a ten by ten matrix for decile ranked outputs. Similarly, the accuracy for a binary target can be split into a two by two matrix. Measurements reported on the diagonal are correct predictions while off diagonal measurements are incorrect predictions. The activation function that predicts the target with the maximum accuracy, or the minimum sum of square error, is then selected by process block 148 as the activation function for that stage. The type of activation function, as well as the weight and parameters of the activation function are stored as neural network stages data set 150. The data set 150 contains the values of the parameters, the type of activation function, the weight, and the linking function of a stage. These values are retained by the data set 150 so that the neural network structure 50 can ultimately integrate all of the individual stages into the neural network.

With respect to the example at hand, process block 144 predicts outcomes for each activation function, and process block 148 sorts the activation functions by the SSE as shown by the following table:

TABLE 9

First Stage Goodness-of-Fit Criteria (Ordered by SSE)

| Run | Activation | SSE | RMSE | Accuracy |
|---|---|---|---|---|
| 2 | TANH | 17.42421 | 0.432848 | 78.000000 |
| 3 | ARCTAN | 17.50822 | 0.433890 | 77.000000 |
| 1 | SQUARE | 17.85211 | 0.438130 | 77.000000 |
| 4 | LOGIST | 17.96578 | 0.439523 | 74.000000 |
| 8 | EXP | 17.96873 | 0.439559 | 74.000000 |
| 6 | SIN | 18.21766 | 0.442593 | 72.000000 |
| 7 | COS | 21.14717 | 0.476853 | 64.000000 |
| 5 | GAUSS | 22.11047 | 0.487593 | 67.000000 |

The above table shows that the TANH function was the best activation function for the first stage and is selected by process block 148. Continuation block 151 indicates that processing continues at decision block 152 on FIG. 2F.

Figure 2F:
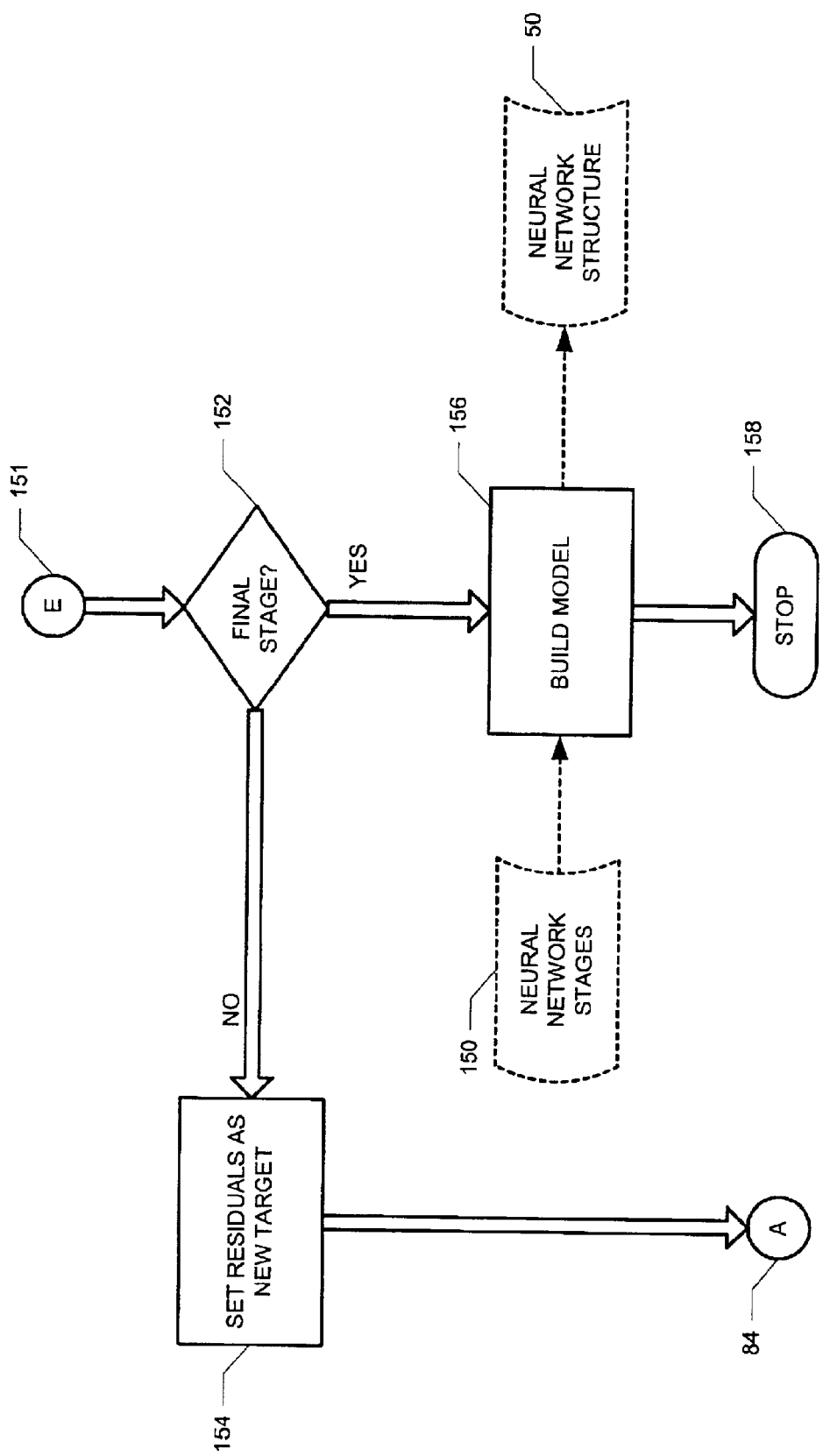

With reference to FIG. 2F, decision block 152 examines whether the specified maximum number of stages (e.g., 5 stages, but more preferably 2 or 3 stages) has been reached or the neural network's predictive capability does not significantly improve (e.g., if the sum-of-squares of the residuals in the component selection process changes by less than, for example, 1 percent) or degrades. If each of these conditions is not present, the saved residuals (the difference between the target and the predicted values) become the new target variables via process block 154, and processing returns to process block 86 (on FIG. 2B). Principal components are selected for the next stage based upon their predictive ability to match the residuals. Thus, the principal components selected in a stage may differ from the selected principal components of the previous stage. In this way, the present invention determines the "best" activation function for each layer that is added to the overall neural network structure 50.

With respect to the example at hand, process block 154 computes the residuals based on the TANH activation. Based on the original principal components (not the binned ones), process block 154 uses these residuals as the target for the next stage (i.e., the second stage).

Because the present invention determines whether the neural network's performance would improve with a second stage, processing continues at process block 86 on FIG. 2B wherein the "best" principal components are selected for this stage. Process block 86 performs a new principal component selection process. The resulting selected principal components 88 for the example's second stage are shown in the following table:

TABLE 10

Second Stage Selected Principal Components

| Component | Eigenvalue | R-Square | F Value | p-Value |
|---|---|---|---|---|
| 11 | 91.632077 | 0.024182 | 2.453373 | 0.1205 |
| 4 | 154.735259 | 0.013756 | 1.401287 | 0.2394 |
| 3 | 168.062843 | 0.006586 | 0.668615 | 0.4155 |

Component Selection: SS(y) and R2

The table shows that principal components 11, 4 and 3 were the best predictors of the current target (i.e., residuals from the first stage).

Process block 90 determines the grid points data set 92 for the second stage and generates the following table:

TABLE 11

Second Stage Grid Table

| Bin # | Value |
|---|---|
| Bin 1 | −3.496463 |
| Bin 2 | −2.627148 |
| Bin 3 | −2.105559 |
| Bin 4 | −1.757833 |
| Bin 5 | −1.410107 |
| Bin 6 | −1.062381 |
| Bin 7 | −0.714655 |
| Bin 8 | −0.366929 |
| Bin 9 | −0.019203 |
| Bin 10 | 0.3285235 |
| Bin 11 | 0.6762496 |
| Bin 12 | 1.0239757 |
| Bin 13 | 1.3717018 |
| Bin 14 | 1.7194279 |
| Bin 15 | 2.067154 |
| Bin 16 | 2.5887431 |
| Bin 17 | 3.4580583 |

Process block 132 of FIG. 2D generates the following frequency table 136 for the second stage:

TABLE 12

Second Stage Frequency Table

| | Bin Middle Point | PC 11 | PC 4 | PC 3 |
|---|---|---|---|---|
| Bin 1 | −3.061806 | 0 | 3 | 0 |
| Bin 2 | −2.366354 | 1 | 4 | 7 |
| Bin 3 | −1.931696 | 0 | 3 | 2 |
| Bin 4 | −1.58397 | 6 | 5 | 4 |
| Bin 5 | −1.236244 | 10 | 6 | 4 |
| Bin 6 | −0.888518 | 8 | 7 | 13 |
| Bin 7 | −0.540792 | 11 | 6 | 9 |
| Bin 8 | −0.193066 | 10 | 9 | 12 |
| Bin 9 | 0.1546605 | 17 | 11 | 13 |
| Bin 10 | 0.5023866 | 12 | 11 | 10 |
| Bin 11 | 0.8501127 | 12 | 15 | 7 |
| Bin 12 | 1.1978388 | 3 | 13 | 3 |
| Bin 13 | 1.5455648 | 6 | 1 | 5 |
| Bin 14 | 1.8932909 | 3 | 3 | 3 |
| Bin 15 | 2.3279485 | 1 | 3 | 6 |
| Bin 16 | 3.0234007 | 0 | 0 | 2 |
| Bin 17 | 1.798E308 | 0 | 0 | 0 |

Process block 138 performs the optimization for the parameters of each activation function as was done in the first stage. Process block 144 calculates predicted values for the second stage. The results for the second stage shows that EXP is the best activation function for this stage (and is selected by process block 148):

TABLE 13

Second Stage Goodness-of-Fit Criteria (Ordered by SSE)

| Run | Activation | SSE | RMSE | Accuracy |
|---|---|---|---|---|
| 8 | EXP | 16.43502 | 0.437155 | 79.000000 |
| 1 | SQUARE | 16.50004 | 0.438019 | 79.000000 |
| 6 | SIN | 16.59742 | 0.439310 | 78.000000 |
| 3 | ARCTAN | 16.60612 | 0.439425 | 78.000000 |
| 2 | TANH | 16.60665 | 0.439432 | 78.000000 |
| 4 | LOGIST | 16.61626 | 0.439559 | 78.000000 |
| 7 | COS | 17.15457 | 0.446623 | 78.000000 |
| 5 | GAUSS | 17.15782 | 0.446665 | 78.000000 |

For each layer, the present invention performs the optimization procedure and selects the best activation function in that stage. At the end of the stages, the present invention summarizes the information of the best activation functions in each stage (note that five stages were used):

TABLE 14

Summary Table across Stages

| Stage | Activ. Func. | Link | SSE | RMSE | Accuracy | AIC | SBC |
|---|---|---|---|---|---|---|---|
| FIRST | TANH | LOGIST | 17.42421 | 0.432848 | 78.000000 | −160.730947 | −142.494756 |
| SECOND | EXP | IDENT | 16.43502 | 0.437155 | 79.000000 | −152.575580 | −116.103197 |
| THIRD | GAUSS | IDENT | 14.41273 | 0.427130 | 77.000000 | −151.705825 | −96.997251 |
| FOURTH | COS | IDENT | 13.73546 | 0.436773 | 82.000000 | −142.518947 | −69.574181 |
| FIFTH | EXP | IDENT | 13.45597 | 0.454989 | 81.000000 | −130.574743 | −39.393786 |

The iterative stage determination reaches an end stage if decision block 152 determines that a pre-selected maximum number of stages has been reached, a pre-selected "improvement" threshold has been satisfied in the calculations, or a minimum residual threshold has been met. If the final stage has been reached as determined by decision block 152, then process block 156 saves all stages from the neural network stages data set 150 to the neural network structure 50, and builds an additive model that is saved in the network stage overview of the neural network structure 50.

For the example at hand, decision block 152 determines that stage construction stops at stage 3 because SSE is decreasing at stage 4, but accuracy is not increasing at the stage. Usually two or three stages are sufficient to obtain a good predicted model. Process block 156 builds the neural network by creating a hierarchical table containing the structure of the neural network. The information in the table for each stage includes the type of activation function for the layer, the weights of the nodes in the layer, the type of linking function, and the parameters for the activation function. The table also includes the principal component decomposition that was used so that input data can first be manipulated into the proper principal component form. More specifically, if a three stage network is chosen, then the final additive model is constructed at process block 152 as follows:

1. For the third stage, Residual 2=g (f (a selected subset of principal components at this stage))+error, where f is the best activation function in the third stage, (i.e. GAUSS), and g is a linking function (i.e. identity link function).

2. Similarly, for the second stage, Residual 1=g (f(a selected subset of principal components at this stage))+error, where f is EXP, and g is the identity link function.

3. For the first stage, Target=g (f(a selected subset of principal components at this stage))+error, where f is TANH, and g is the logistic link function.

Therefore the final predicted values for a four stage neural network 50 are: Predicted values=Predicted values of the original target at stage 1+Predicted values of residuals from stage 1 at stage 2+Predicted values of residuals from stage 2 at stage 3. Processing terminates at stop block 158.

Figure 5A:
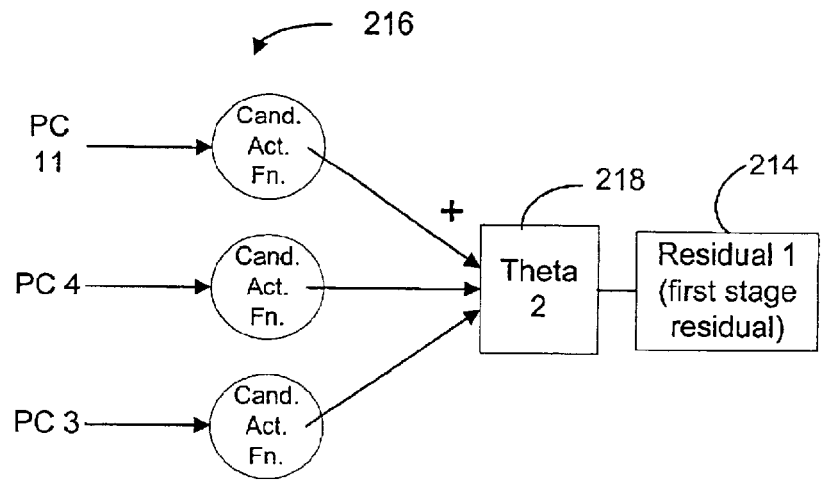
FIGS. 5A and 5B are neural network structure diagrams that depict the addition of a second neural network layer in accordance with the teachings of the present invention.
Figure 5B:
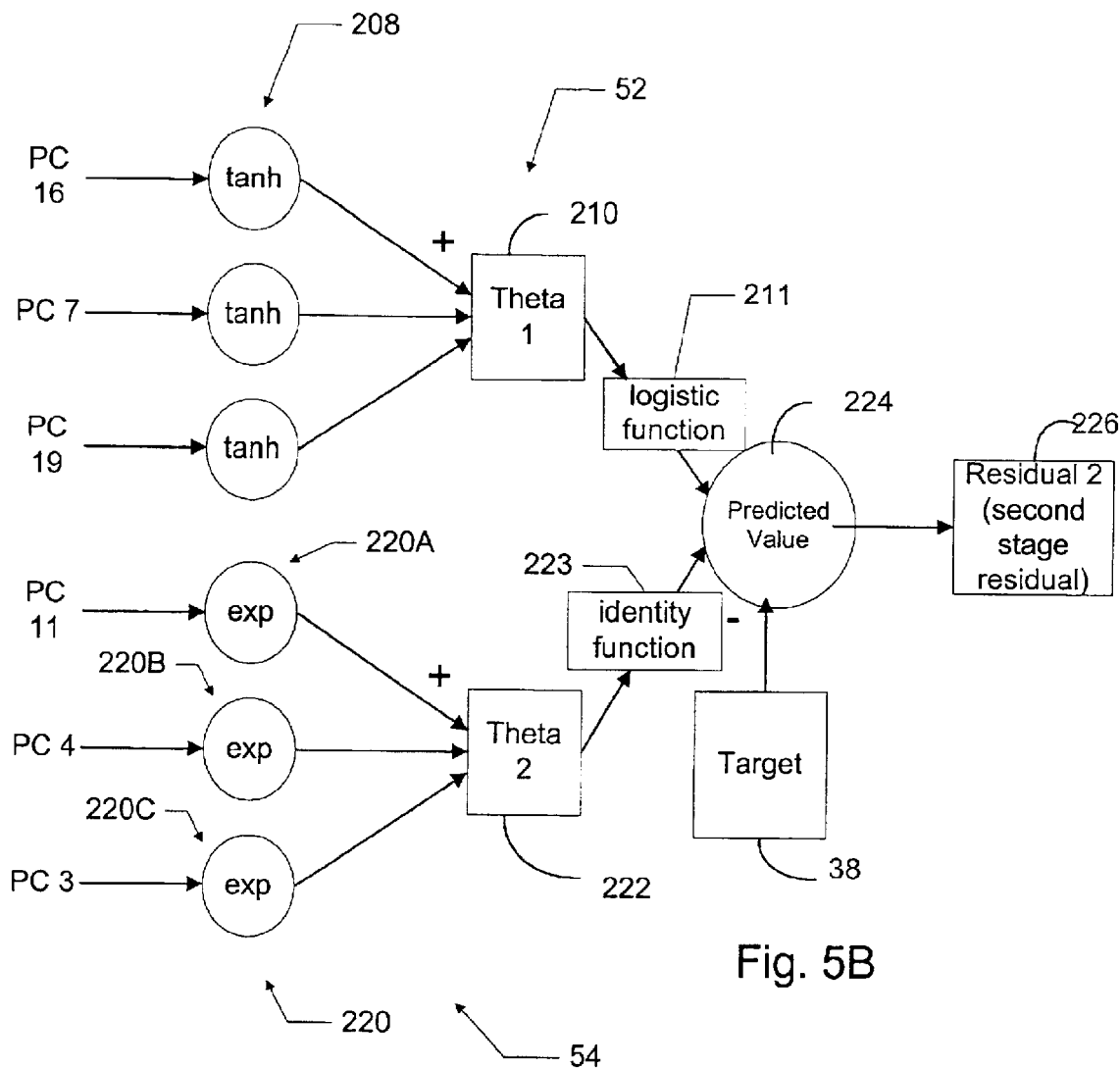
Figure 6A:
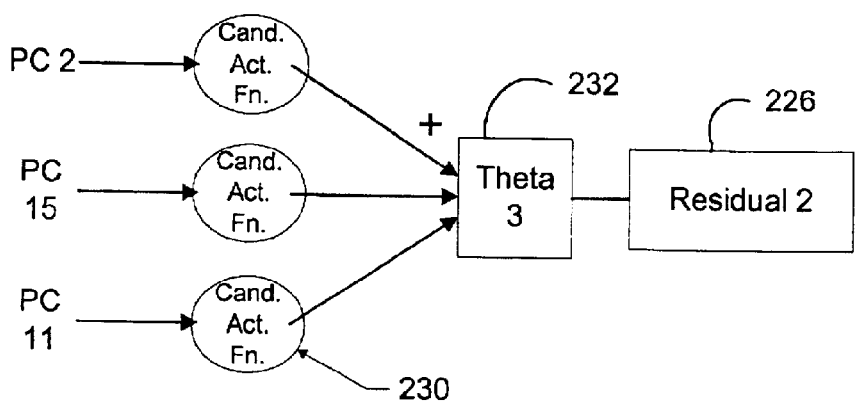
FIGS. 6A and 6B are neural network structure diagrams that depict the addition of a third neural network layer in accordance with the teachings of the present invention.
Figure 6B:
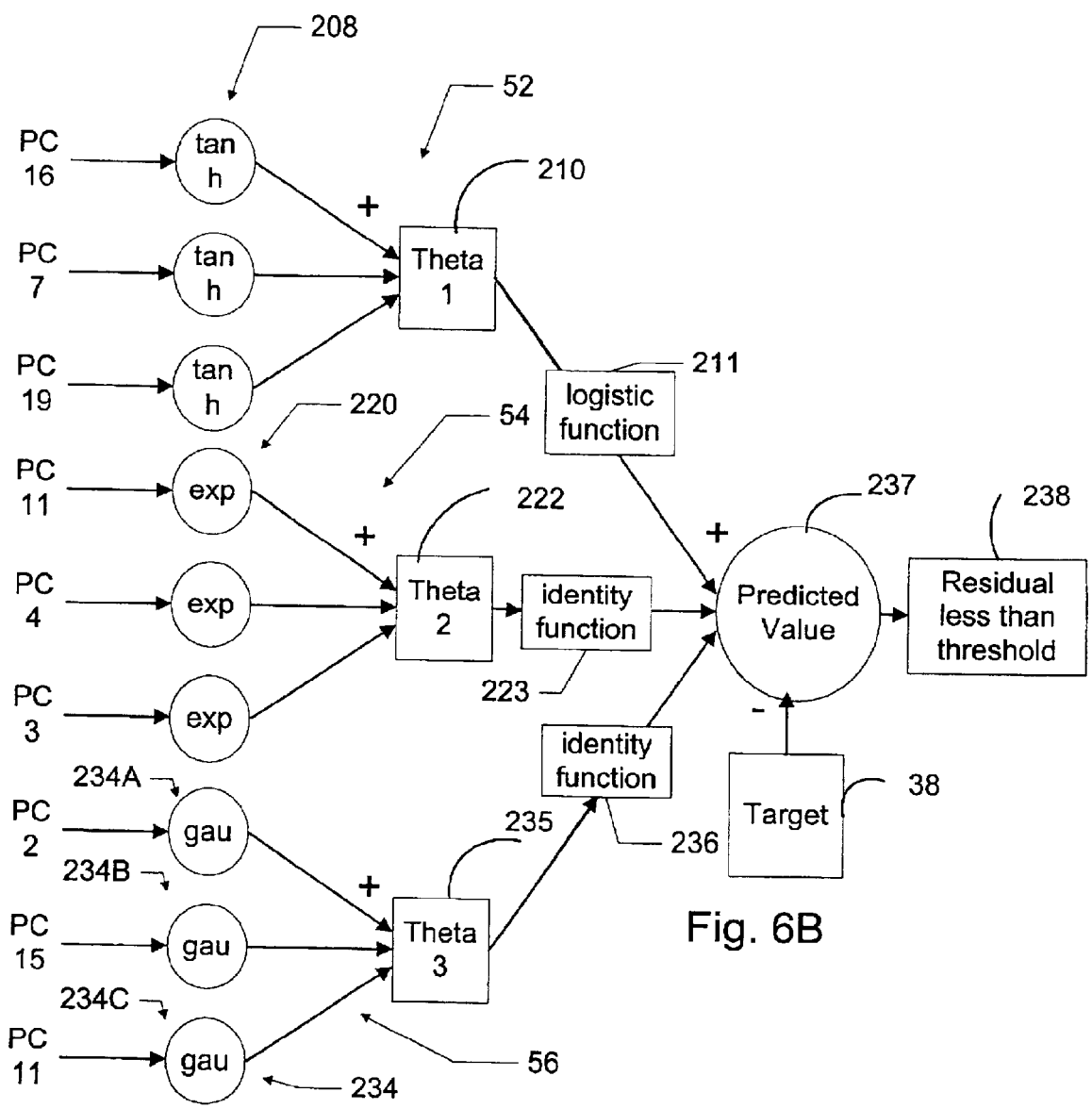

FIGS. 4A–6B graphically show the present invention incrementally building the neural network for the example described above. For example, FIGS. 4A and 4B depict the present invention adding the first stage to the neural network of the example; FIGS. 5A and 5B depict the present invention adding the second stage to the neural network of the example; and FIGS. 6A and 6B depict the present invention adding the third stage to the neural network of the example.

More specifically, FIG. 4A shows the optimization step of the first stage of the example. FIG. 4A shows the selected principal components, PC 16, PC 7, and PC 19, that were selected from the entire principal component set as input to an activation function layer 200. These selected principal components are used with the discrete grid points to optimize parameters for each of the candidate activation functions and an intercept 204. The outputs of the activation layer 200 and the weight (theta 1) 204 are summed and compared with the values of the target variable 38 to determine the best parameter values for the activation function layer 200 using the Levenberg-Marquardt optimization. The optimization determines optimal parameters for each of the candidate activation functions 48 independently.

With reference to FIG. 4B, the selected principal components are linked to an optimized activation layer 208 for each of the optimized activation functions in the candidate activation function set. Each of the candidate activation functions is tested with the selected principal components of the predictor variables data set 36. These principal components from the entire predictor variables data set 36 are passed through the activation layer 208 and summed with an optimized intercept 210 to generate a predicted value 212. The predicted value 212 is subtracted from the target 38 to form a residual 214. The activation function with the smallest SSE is chosen as the activation function for the first stage.

In this example, the hyperbolic tangent function, TANH, produces the smallest SSE for the first stage. Within each node, 208A, 208B, and 208C, the optimized parameter values for the TANH activation function are stored. For example, node 208A calculates $a_{11}*\tanh(b_{11}*PC16)$. Similarly, node 208B calculates $a_{12}*\tanh(b_{12}*PC7)$, and node 208C calculates $a_{13}*\tanh(b_{13}*PC19)$. The summing block 210 adds these three calculations to theta 1 which is then $a_{11}*\tanh(b_{11}*PC16)+a_{12}*\tanh(b_{12}*PC7)+a_{13}*\tanh(b_{13}*PC19)+\text{theta } 1$. A logistic link function 211 can then be applied to calculate the predicted value 212 from the output of the summing block 210. The residuals of the model based on the selected activation function are saved in order to build the second stage.

FIG. 5A shows the optimization step for the second stage of the example. FIG. 5A shows the selected principal components, PC 11, PC 4, and PC 3, that were selected for the second stage from the entire principal component set to provide input to a second activation function layer 216. These selected principal components are used with the discrete grid points values and frequencies to optimize parameters for each of the candidate activation functions and an intercept (theta 2) 218. The outputs of the activation layer 216 and the weight 218 are summed and compared with the values of the residual 214 to determine the best parameter values for each activation function using the Levenberg-Marquardt optimization.

With reference to FIG. 5B, the selected principal components from the second stage are linked to an optimized activation layer 220 for each of the optimized activation functions from the candidate activation function set. Each of the candidate activation functions is tested using the scores of the selected principal components of the predictor variables data set 36. The principal components calculated from the entire predictor variables data set 36 are passed through the activation layer 220 and then summed with an optimized weight 222 to generate the predicted value of the residual 214. This predicted value is summed with the predicted value from the first stage 52 to form a predicted value of the target 224. The predicted value 224 is subtracted from the target 38 to form a residual 226. The activation function with the smallest SSE is chosen as the activation function for the second stage.

In this example, the exponential function, EMP, produces the smallest SSE for the second stage. Within each node, 220A, 220B, and 220C, the optimized parameter values for the EXP activation function are stored. For example, node 220A calculates $a_{21}*\exp(b_{21}*PC11)$. Similarly, node 220B calculates $a_{22}*\exp(b_{22}*PC4)$, and node 220C calculates $a_{23}*\exp(b_{23}*PC3)$. The summing block 222 adds these three calculations to theta 2 to form $a_{21}*\exp(b_{21}*PC11)+a_{22}*\exp(b_{22}*PC4)+a_{23}*\exp(b_{23}*PC3)+\text{theta } 2$. An identity function 223 can then be applied to calculate the predicted value of the first stage residuals from the output of the summing block 222. The output of the identity function 223 is added to the output of the logistic function 211 from the first stage, to generate the predicted second stage value 224. The predicted value 224 is then subtracted from the target 38 to generate the second stage residuals 226. Alternatively, the output of the summing block 222 may be subtracted from the first stage residual 214 to generate the second stage residual 226. The residuals from the selected activation function are saved in order to build the third stage.

FIG. 6A shows the optimization step for the third stage of the example. FIG. 6A shows the selected principal components, PC 2, PC 15, and PC 11, that were selected for the third stage from the entire principal component set to provide input to a third activation function layer 230. These selected principal components are used with the discrete grid points values and frequencies to optimize parameters for each of the candidate activation functions and a weight 232.

The outputs of the activation layer 230 and the intercept 232 are summed and compared with the values of the residual 226 to determine the best parameter values for each activation function using the Levenberg-Marquardt optimization.

With reference to FIG. 6B, the selected principal components from the third stage are linked to an optimized activation layer 234 for each of the optimized activation functions from the candidate activation function set. Each of the candidate activation functions is tested with the selected principal components of the predictor variables data set 36. The principal component scores calculated from the entire predictor variables data set 36 are passed through the activation layer 234 and then summed with an optimized intercept 235. The sum is then passed to an identity function 236, which then generates the predicted values of the second stage's residual. This predicted value is summed with the predicted value from the first and second stages to form a predicted value 237 of the target 38. The predicted value 237 is subtracted from the target 38 to form a residual 238. In this example, the activation function that produces the best SSE is the Gaussian function, GAU. The residual calculated from the combination of the Gaussian function and the other stage outputs reaches a set threshold and thus stops the network from adding a fourth layer.

The preferred embodiment described with reference to FIGS. 4A–6B and the other drawing figures is presented only to demonstrate an example of the invention. Additional and/or alternative embodiments of the invention would be apparent to one of ordinary skill in the art upon reading this disclosure. For example, the present invention handles observations with missing values. Observations with missing values in the target are not included in the analysis. However, those observations are scored, i.e., predicted values are computed. Observations with missing values in the independent variables are processed depending on the scale type of the variable. For numeric variables, missing values are replaced by the mean of the variable; and for class variables, missing values are treated as an additional category.

This approach may also be used to model a neural network to predict multiple target vectors. The system that determines the parameters independently for each layer may also be used to independently determine parameters for each of a plurality of target vectors. Each target vector can then be independently modeled within each stage, and, simultaneously, a stage of a neural network may account for each target variable independently.

As another example of the broad scope of the present invention, the present invention includes an implementation with a distributed processing capability. FIG. 7 depicts an exemplary distributed implementation involving the optimization and selection of an activation function for a given layer. When activation functions are to be processed by the present invention as shown by reference number 230, the parameter optimization function 138 may be allocated to separate computer processes (240, 242, and 244) in order to process a specific activation function. The predictive value function 144 may similarly be allocated to separate computer processes (246, 248, and 250). After computer processes 246, 248, and 250 have completed, computer process 148 can select the best activation function for use in a layer. This distributed approach is in stark contrast to a traditional neural network where, in order to test different activation functions at a single stage, the entire network must be solved again. By testing each stage independently, the network of the present invention can test all possible layer configurations before proceeding to the next stage.

Figure 8:
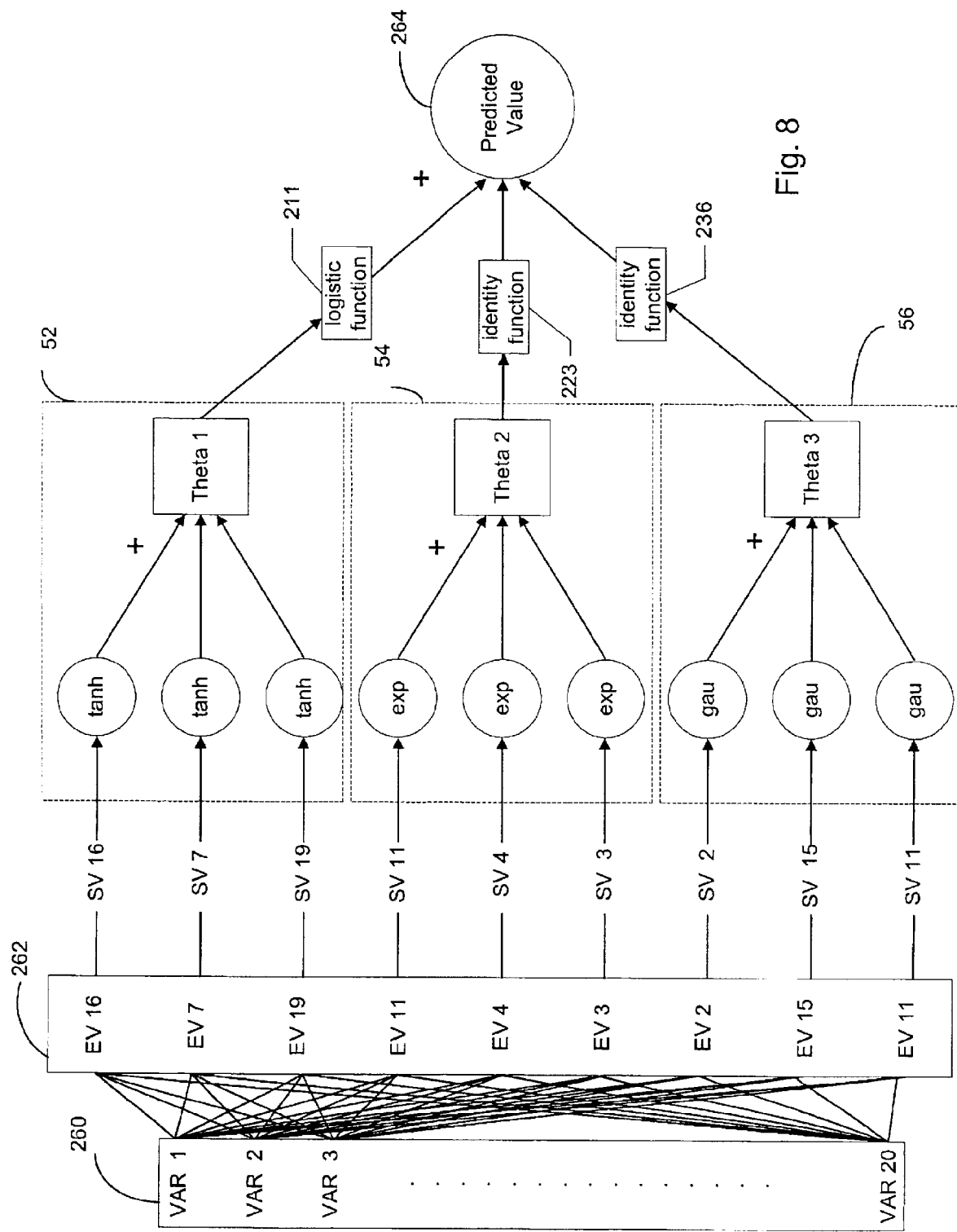
FIG. 8 is an example neural network structure constructed in accordance with the teachings of the present invention for scoring a non-training input data set.

With reference to FIG. 8, an example neural network structure 50 is constructed in accordance with the teachings of the present invention for scoring a non-training input data set 260. The neural network includes the three stages 52, 54, and 56 determined in FIGS. 4A–6B. The non-training input observation data set 260, for which the target value is unknown, is the input for an eigenvector layer 262, which is an orthogonal layer that converts an input set into a scored variable data set for the selected eigenvectors. The scored variable data set values are the input for the stages 52, 54, and 56. The outputs of the stages 52, 54, and 56 are summed and generate a predicted output value 264 for the input observation set 260. The predicted output value then may determine an output state for the target variable. Thus the network 50 can predict an output state for the input observation set 260.

What is claimed is:

1. A computer-implemented method for building an artificial neural network from a set of different types of candidate activation functions, comprising the steps of:

retrieving an input data set that includes observations and at least one target for the observations;

reducing the input data set such that the reduced input data set contains a number of points less than the number of observations;

optimizing parameters of the candidate activation functions with respect to the reduced input data set through use of an objective function;

generating results for each of the candidate activation functions using the optimized parameters of the candidate activation functions and the reduced input data set;

selecting a first activation function from the candidate activation functions based upon the generated results;

using the selected first activation function within a first layer of the artificial neural network, wherein residuals result from predictions by the first layer's selected activation function of the target; and selecting a second activation function different from the first activation function to form a second layer based upon the second activation function's capability to predict the residuals.

2. The method of claim 1 wherein a candidate activation function has a function type and one or more associated parameters;

wherein the first and second selected activation functions differ with respect to function type from each other;

wherein the first and second selected activation functions further differ with respect to weights associated with their inputs and outputs.

3. The method of claim 2 wherein a first candidate activation function type is selected as the first activation function for use within a first layer of the artificial neural network, wherein a second candidate activation function type is selected as the second activation function for use within a second layer of the artificial neural network, wherein the selected first candidate activation function type is a different function type than the selected second candidate activation function type because of the function types respectively associated with the selected first and second candidate activation functions and not because of weights associated with the selected first and second candidate activation functions.

4. The method of claim 2 further comprising the steps of:

determining principal components for the input data set;

selecting the principal components that are substantially correlated to the target; and generating a frequency table that describes frequency relationships between values of the selected principal components and the inserted points.

5. The method of claim 4 further comprising the step of:
determining which of the candidate activation functions to use within a layer of the artificial neural network by using the frequency relationships.

6. The method of claim 4 further comprising the steps of:
determining parameters of the candidate activation functions by optimizing the candidate activation functions with respect to a predetermined objective function;
selecting which of the candidate activation functions to use within a layer of the artificial neural network; and
creating a layer of the artificial neural network with the selected candidate activation function and its respective optimized parameters.

7. The method of claim 6 wherein the objective function is a sum of squares error objective function.

8. The method of claim 6 wherein the objective function is an accuracy rate objective function.

9. The method of claim 6 wherein a layer weight is determined during the optimizing of the candidate activation functions.

10. The method of claim 6 wherein the frequency table specifies which observations of the selected principal components is accorded a greater weight during the optimizing of the candidate activation functions.

11. The method of claim 6 further comprising the steps of:
generating prediction outcomes for each of the candidate activation functions; and
selecting one of the candidate activation functions to use within a layer of the artificial neural network based upon the generated prediction outcomes.

12. The method of claim 11 wherein the optimized parameters of the candidate activation functions are used to generate the prediction outcomes.

13. The method of claim 11 wherein the prediction outcomes are generated by testing each of the candidate activation functions with the principal components and the observations.

14. The method of claim 11 wherein the observations are passed through a linking web into each of the candidate activation functions to evaluate fit of the prediction outcomes to an evaluation data set.

15. The method of claim 14 wherein the input data set is used as the evaluation data set for determining a first stage of the artificial neural network.

16. The method of claim 15 wherein residuals from the first stage are used as the evaluation data set for determining a second stage of the artificial neural network.

17. The method of claim 16 wherein residuals from the second stage are used as the evaluation data set for determining a third stage of the artificial neural network.

18. The method of claim 11 wherein the parameters of the candidate activation functions are generated substantially in parallel.

19. The method of claim 11 wherein the prediction outcomes for the candidate activation functions are generated substantially in parallel.

20. The method of claim 1 wherein a candidate activation function has a function type and one or more associated parameters;
wherein nodes in the first layer have a different activation function type than nodes in the second layer because different activation functions were selected from the set of candidate activation functions.

21. The method of claim 1 wherein the neural network is constructed in a layer-by-layer stepwise fashion such that the first layer of the neural network is completed before the second layer of the neural network is determined;
wherein type of activation function for the second layer is unknown until after the first layer has been completed.

22. A computer-implemented system for building an artificial neural network from a set of different types of candidate activation functions, comprising:
first software instructions configured to retrieve an input data set that includes observations and at least one target for the observations;
wherein parameters of the candidate activation functions are optimized with respect to the input data set through use of an objective function;
second software instructions configured to generate results for each of the candidate activation functions using the optimized parameters of the candidate activation functions and the input data set;
third software instructions configured to select a first activation function from the candidate activation functions based upon the generated results;
wherein the selected first activation function is used within a first layer of the artificial neural network,
wherein residuals result from predictions by the first layer's selected activation function of the target; and
fourth software instructions configured to select a second activation function different from the first activation function to form a second layer based upon the second activation function's capability to predict the residuals.

* * * * *